United States Patent [19]
Shionozaki

[11] Patent Number: 6,038,214
[45] Date of Patent: Mar. 14, 2000

[54] METHOD AND APPARATUS FOR CONTROLLING COMMUNICATION

[75] Inventor: Atsushi Shionozaki, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,030

[22] Filed: Feb. 19, 1997

[30] Foreign Application Priority Data

Feb. 23, 1996 [JP] Japan .................................. 8-035990

[51] Int. Cl.⁷ .............................. H04L 12/28; G06F 15/16
[52] U.S. Cl. ......................... 370/230; 370/351; 370/408; 370/431; 709/225
[58] Field of Search ..................................... 370/230–236, 370/465, 468, 431, 433, 437, 458, 400, 401, 241, 351, 408; 395/200.53, 200.54, 200.56, 200.3, 200.33, 200.59, 200.43; 709/200, 229, 225, 226

[56] References Cited

U.S. PATENT DOCUMENTS

| | | | |
|---|---|---|---|
| 5,517,494 | 5/1996 | Green | 370/408 |
| 5,719,942 | 2/1998 | Aldred et al. | 380/49 |
| 5,742,772 | 4/1998 | Sreenan | 395/200.56 |
| 5,745,694 | 4/1998 | Egawa et al. | 709/225 |
| 5,748,892 | 5/1998 | Richardson | 395/200.3 |

*Primary Examiner*—Alpus H. Hsu
*Assistant Examiner*—Afsar M. Qureshi
*Attorney, Agent, or Firm*—Limbach & Limbach L.L.P.

[57] ABSTRACT

A communication controlling method and apparatus enables an efficient use of a communication resource. A QoS control object working on each node of a network monitors amounts of the resource required by communication sessions present in each node. When a QoS control demand message is issued from a gateway node of the network to each node on the network, demanding increase of the amount of the resource allocated to a specified communication session, each node re-allocates, based on the order of priority of communication sessions therein or on the state of use of the resource in such communication sessions, whole or part of the resource which has been allocated to another communication session to the specified communication section.

10 Claims, 5 Drawing Sheets

METHOD AND APPARATUS FOR CONTROLLING COMMUNICATION

BACKGROUND OF THE INVENTION

1. Field of the Invention

The present invention relates to a communication controlling method which is suitably used where there is a need for adjusting the amounts or levels of communication resources allocated to each communication session. The present invention also is concerned with a communication controlling apparatus suitable for carrying out such a communication controlling method.

2. Description of the Related Art

Nowadays, various studies and research are being conducted in order to implement real-time communications in wide-area networks. One of the measures proposed through such studies and research, which is now expected to be promising, employs a protocol which is referred to as "resource reservation protocol" which reserves, in advance of the commencement of a communication, the resource which is necessary for the communication to be achieved, so as to ensure high degree of QoS (Quality of Service). The term "resource" is used hereto mean, for example, CPU (Central Processing Unit) processing time, network bands, data buffer capacity, or the like.

In the case of the internet community, there are two types of protocols which are noted as being usable in Internet Draft, which is a phase prior to the phase of RFC (Request for Comments) which describes the protocol specifications. One of these two types of protocol is the RSVP (Resource Reservation Protocol) mentioned above, while the other is ST-2 (Internet Stream Protocol, Version 2).

It is highly desirable that the use of such a resource reservation protocol makes efficient use of the resources which are limited in amounts. There are some resource reservation protocols which are intended to meet this requirement. In such a protocol, a mechanism is employed which permits a dynamic change in QoS of a specified communication session or sessions. In the following description, this type of control will be referred to as "Dynamic QoS Control". In most cases, the Dynamic QoS control is triggered by a communication end point.

Figure 1:
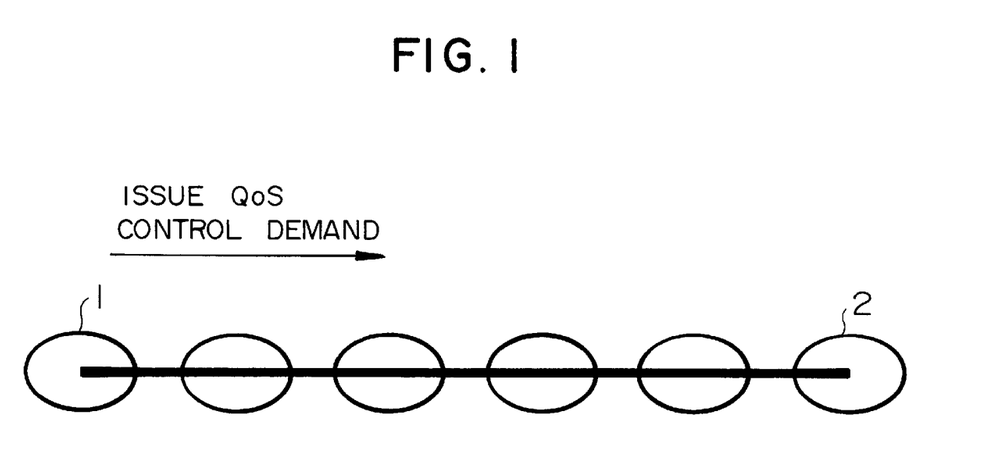
FIG. 1 is a schematic illustration of a conventional Dynamic QoS Control mechanism.

FIG. 1 schematically shows how the conventional D.Q.C is performed. A plurality of nodes (host computers) are indicated by ellipses. A Dynamic QoS Control demand is issued from an end entity (host or node) which is marked as "source 1" to a destination node which is marked as "destination 2". Thus, in the conventional Dynamic QoS Control mechanism, the control of QoS is normally conducted explicitly by the entity which is the communication end point.

Meanwhile, studies and research are also being undertaken for developing technology which are to be used in wide-area network for the purpose of enabling transfer of continuous media data, e.g., video and audio data which require real-time reproduction, as well as transfer of data which undergoes a very severe restrictions in regard to time.

It is to be noted, however, various problems or difficulties are encountered in completing communications, when resources necessary for communications are allocated exclusively to a certain communication session. For instance, it is not a rare case that a communication session which has reserved the resources constantly make full use of such reserved resources.

More specifically, when a communication session reserves a resource, the session designates the resource amount with parameters which are determined based on the maximum presumable rate of data transfer. However, the amount of data normally transferred is much smaller than the maximum data transfer. Consequently, there remains a considerable amount of resource which has been reserved but not usually used. This undesirably leads to an ineffective use of the limited resource.

SUMMARY OF THE INVENTION

In view of the foregoing problems, it is an object of the present invention to provide a communication control method, as well as an apparatus, which enables an efficient use of the limited capacity of a resource, by monitoring the allocatable amount of the resource and amounts of the resource used by respective communication sessions, and allocating, from one session to another as required, any amount of the resource which has been reserved but is used only seldom.

To these ends, according to one aspect of the present invention, there is provided a communication controlling method for controlling, in executing an inter-node data transfer on a network, the amounts of a resource allocated to a plurality of communication sessions which are present in each the node, the method comprising: a monitoring step in which the state of use of the resource allocated to each communication session of each the node is monitored; and a resource re-allocating step in which, when a message demanding a change in the amount of resource allocated to a predetermined communication session is received, whole or part of the resource which has been allocated to another communication session is re-allocated to the communication session with which the demand for changing the amount of resource has been issued, based on the states of use of the resource in the respective communication sessions to which the resource has been allocated.

According to another aspect of the present invention, there is provided a communication controlling apparatus for controlling, in executing an inter-node data transfer on a network, the amounts of a resource allocated to a plurality of communication sessions which are present in each the node, the apparatus comprising; monitoring means for monitoring the state of use of the resource allocated to each communication session of each the node; and resource re-allocating means which, when a message demanding a change in the amount of resource allocated to a predetermined communication session is received, re-allocate whole or part of the resource which has been allocated to another communication session to the communication session with which the demand for changing the amount of resource has been issued, based on the states of use of the resource in the respective communication sessions to which the resource has been allocated.

These and other objects, features and advantages of the present invention will become clear from the foregoing description when the same is read in conjunction with the accompanying drawings.

DESCRIPTION OF THE PREFERRED EMBODIMENTS

Figure 2:
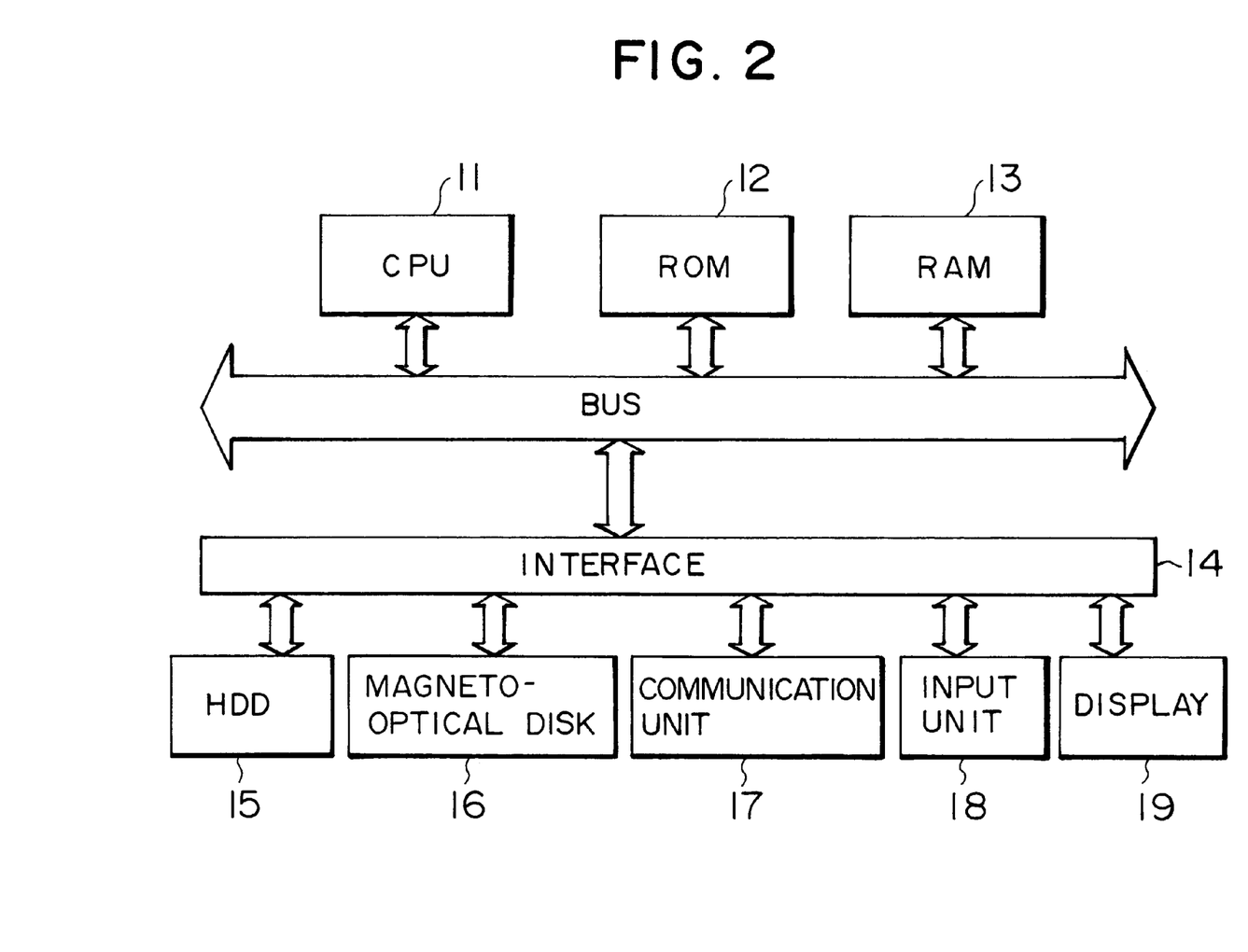
FIG. 2 is a block diagram showing, by way of example, the structure of a host computer which serves as a node.

A description will be first given of the structure of a host computer which constitutes each node of the nodes of a network, with specific reference to FIG. 2. A ROM (Read Only Memory) 12 stores a system program. A CPU 11 executes various kinds of processing in accordance with the system program stored in the ROM 12 and other programs which are developed in a RAM (Random Access Memory) 13, including a QoS control which will be described below. The RAM 13 is adapted for storing various programs and data, e.g., control data to be used in the QoS control, which are required by the CPU 11 in executing various kinds of processing. An interface 14 conducts management of data input and output to and from an HD (Hard Disk) 15, a magneto-optical disk 16, a communication unit 17, an input unit 18 and a display unit 19. The interface 14 is connected also to CPU 11, ROM 12 and RAM 13 via a BUS.

The hard disk 15 is arranged to store, whenever necessary, data and programs which require access at comparatively high access speeds. The opto-magnetic disk 16 is adapted to store, as required, data and programs which may be accessed at speeds lower than the access speeds required by the data and program stored in the hard disk 15. The communication unit 17 is designed and constructed to perform any control which is necessary in communicating with other host computers or client's computers through a network such as the internet. The input unit 18 has, for example, a keyboard and a mouse which are used by the user to input to the computer various kinds of instruction and information as required. The display unit 19 has a CRT or an LCD for displaying characters and images.

The network having nodes constituted by host computers of the type described can be efficiently used in transferring image data from one to another node on the network, provided that a control system is available for enabling transfer of image data at a large rate only when such a large transfer rate is necessary due to vivid or vigorous motion of the image on display, although the transfer rate depends on the nature of the communication session.

Such a system requires a control which performs monitoring of the allocatable amount of resource and amounts of the resource used in respective communication sessions and re-allocation of the resource among the communication sessions in such a manner as to make efficient use of the resource which has been reserved but not used usually. This type of control will be referred to as "Automatic QoS Control", hereinafter.

In the case of an application which sustains a severe time restriction, the use of the automatic QoS control may not be preferred, depending on the amount of resource allocated and the method of executing such a control. For instance, when it is absolutely necessary to meet a deadline, a problem or difficulty arises in regard to trade-off between the time restriction and the amount of resource to be allocated.

In contrast, where the restriction in regard to time is less severe and need not be fully met in a strict sense, as in the case of continuous multi-media communication, the automatic QoS control functions effectively.

A description will now be given of a type of automatic QoS control which embodies the present invention. This automatic QoS control requires the following messages, in order that it operates in cooperation with the resource reservation protocol of the network architecture.

1. Message demanding generation of communication session after elapse of a predetermined time "t".
2. Message for changing QoS of a specified communication session after elapse of a predetermined time "t".
3. Message for tentatively changing QoS of a specified communication session after elapse of a predetermined time "t".
4. Message demanding generation of communication session which periodically requires a resource.
5. Message for changing QoS of a specified communication session which periodically requires a resource.
6. Message for tentatively changing QoS of a specified communication session which periodically requires a resource.

The change of the QoS of a preselected communication session includes two types of change: namely, decreasing the resource amount allocated to this communication session and increasing the resource amount allocated to the same. In most cases, a demand for increasing the resource amount is issued through designation of the application. In some cases, resource amount which has been allocated to a certain application is reduced in order to meet a QoS demand given by another application.

When the QoS of a preselected communication session is designated by an application as described above, upper and lower limits of designation of QoS, i.e., allowable range of QoS, is set for each of the communication sessions. In the event of a shortage in the resource under the QoS control, it is allowed to decrease the amount of resource in an existing session, unless the resource amount left in this session remains within this allowable range.

It is thus possible to make efficient use of the resource by a reasonable inter-session sharing of the resource implemented by the automatic QoS control. When there is an order of priority among the communication sessions, it is advisable to introduce a mechanism which enables preferential allocation of the resource to the session of the top priority. This mechanism, although not essential, makes it possible to reflect to some extent the degrees of importance of applications upon the whole system, i.e., to allocate greater amount of resource preferentially to application of greater importance.

A description will now be given of a method of implementing the above-described automatic QoS control. Basically, it is to be understood that an object for enabling automatic QoS control, so-called "demon" in UNIX (trademark of Bell Laboratories), exists in each node constituted by a host computer. This object, which will be referred to as "automatic QoS control object", has for example the following functions:

1. resource preemption function; and
2. session/channel resource management function.

Basically, the QoS control object always grasps and understands the amounts of resources required by all the sessions which are present in the node under the management of the QoS control object. At the same time, when a new demand is received, the QoS control object determines whether such a demand can be met. In contrast to the case of the conventional dynamic QoS control mechanism, it is possible in the present invention that the demand is accepted, even when the resource has been fully allocated to sessions, by virtue of the above-described function preemption function and the aforesaid control message based on time concept.

The preemption function occurs, for example, in the following events.

1. When there is a communication session of a low priority.
2. When there is another communication session in which the QoS will still remain in the allowable range even when resource is preempted therefrom.

Figure 3:
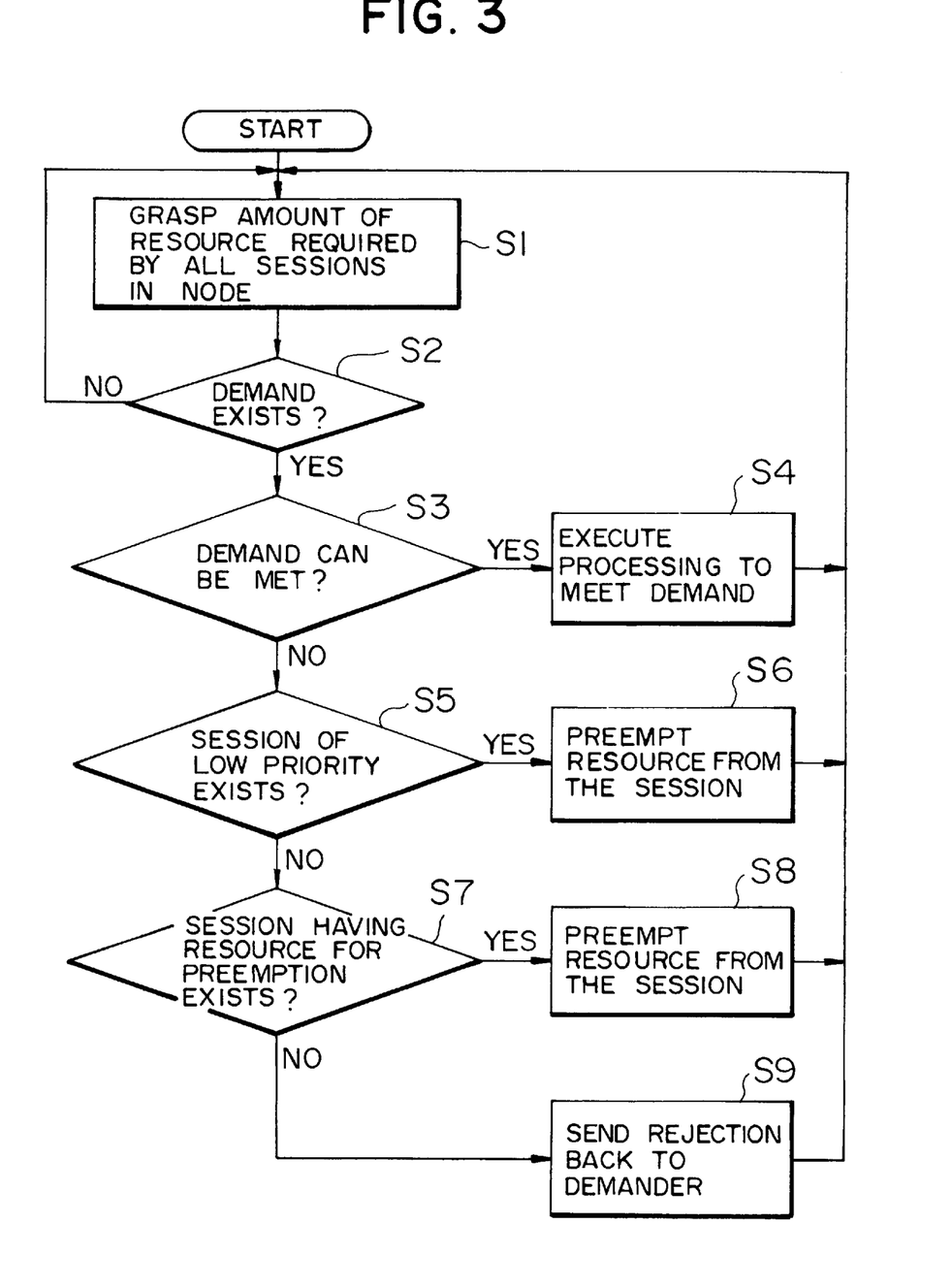
FIG. 3 is a flow chart illustrative of an automatic QoS control process in accordance with the communication control method of the present invention.

FIG. 3 is a flow chart illustrative of the process of the above-described automatic QoS control. The operation shown in this Figure is executed in each node of the network.

In the first step S1, the QoS control object working on each node grasps the total amount of the resource required by the communication sessions involved in this node.

The next step, Step 2, determines whether or not a demand, e.g., a request for increasing the amount of resource allocated to a specific session, has existed. When no demand has been confirmed, the process returns to Step S1 to repeat the described operation, whereas, when it has been determined that such a demand has existed, the process proceeds to Step S3.

Step S3 determines whether such a demand can be met: namely, whether it is allowed to increase the amount of resource allocated to a specific session. The process advances to Step S4 when it has been determined in Step S3 that the demand can be met, i.e., when there is unused amount of the resource. In Step S4, a processing is executed to meet the demand by increasing the amount of the resource in the above-mentioned session. The process then returns again to Step S1 so that the described process is repeated. When it has been determined in Step 3 that the demand cannot be met, the process skips to Step S5.

Step S5 determines whether or not any communication session of a lower order of priority exists. More specifically, it is determined whether or not any communication session exists having a priority order lower than the session for which the demand has been issued to increase the resource amount. If it has been determined that a communication session of such a lower order of priority exists, the process proceeds to Step S6 in which preemption is performed to shift the resource from this session to another session, specifically to the session with which the demand for increasing the resource amount has been issued, i.e., the communication session which is in need of the increase the resource amount. Conversely, if it has been determined that there is no communication session of lower order of priority, the process skips to Step S7.

Step S7 determines whether not there is any communication session from which the resource can be preempted, i.e., any session which is not making full use of the resource allocated thereto and which will maintain its QoS within the allowable range even after any preemption therefrom. When it has been determined that there is such a communication session that permits preemption of data therefrom, the process proceeds to Step S8 which executes preemption of the resource from this session and delivers the same to another communication session. In this case, the preempted resource is allocated to the communication session with which the demand for increasing the resource amount has been issued, i.e., the session which is in need of the increase in the resource amount. Conversely, when it has been determined that there is no communication session which would permit preemption of the resource therefrom, the process proceeds to Step S9 which sends rejection, i.e., non-acceptance of the demand, back to the demander. The process then returns to Step S1 so that the process as described is repeated starting from Step S1. The described Steps in the process may be executed sequentially on all the nodes involved in the communication session.

According to the present invention, monitoring of the resource amounts on communication sessions and preemption of the resource are performed in the described manner.

The preemption of allocated resource by another communication session may encounter a very strong feel of resistance. In order that the preemption of the resource can be executed without resistance, it is necessary to consider a function which enables a temporary change of the time restriction of a control message which is used for changing in each node the state of resource allocation, i.e., a temporary change of the QoS of a preselected session.

For instance, it is assumed here that resource has been preempted from a certain communication session without causing the QoS of this session to fall out of the allowable range. Two cases are conceivable: namely, a first case in which the preempted resource is used continuously and a second case in which the preempted resource is used only temporarily. In the second case, it is possible that both the communication session from which the resource has been preempted and the communication session which has preempted the resource make common use of the preempted resource, without causing any influence on the first-mentioned session, by using the above-mentioned control message.

Figure 4:
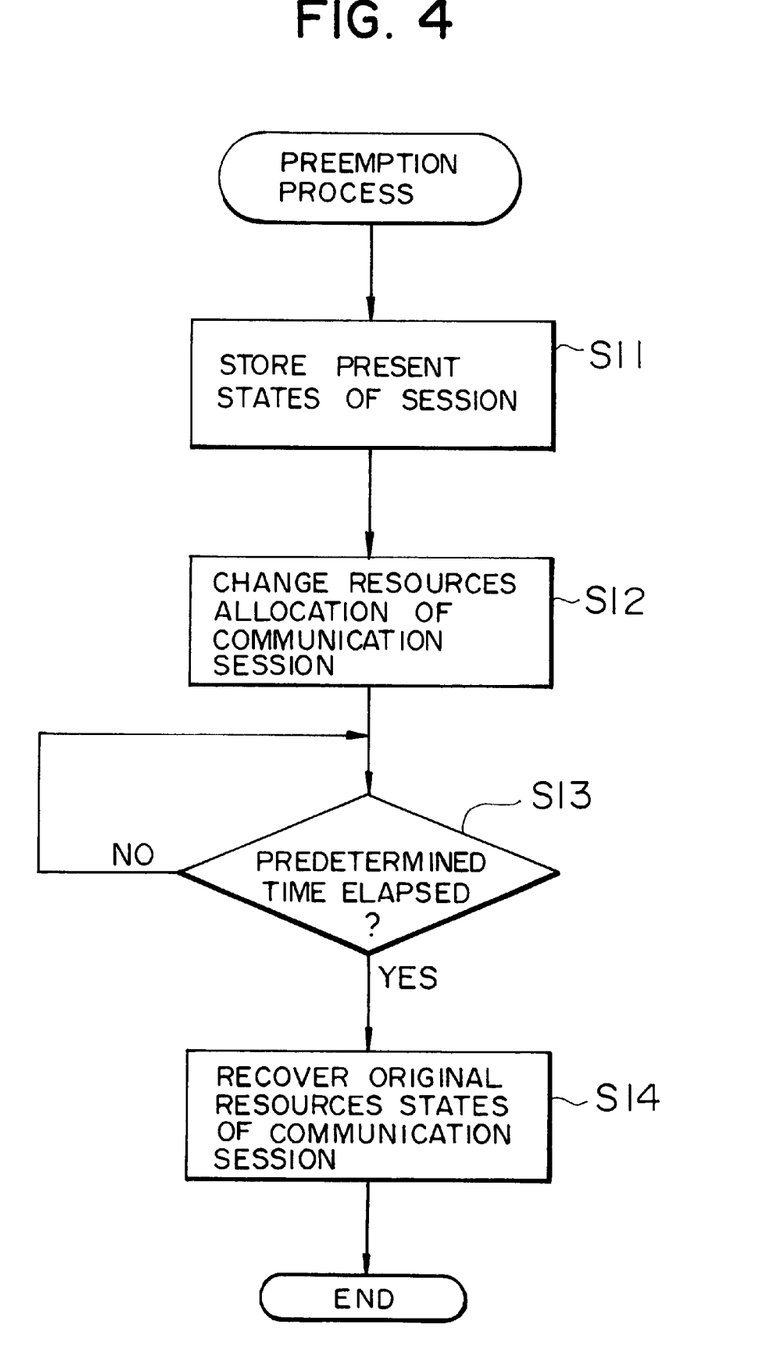
FIG. 4 is a flow chart illustrative of a process for a tentative change of resource allocations to communication sessions.

FIG. 4 illustrates, by way of example, a process for temporarily changing the allocation of a resource to a certain communication session. The process described before in connection with FIG. 3 is executed when a demand for changing QoS is received from another communication session. The process shown in FIG. 4 is executed when preemption by a communication session from another communication session is executed in each of Steps S6 and S8 of the process shown in FIG. 8.

Step S11 stores the states of resource in the communication sessions to be subjected to the change. Namely, the state of resource in the communication session to which the preempted resource is to be allocated and that in the communication session from which the resource is to be preempted are stored in Step S11. Step S12 executes the preemption. Namely, re-allocation, i.e., change in the states of resource allocation, between the communication sessions is conducted. Step S13 monitors whether a predetermined time "t" has elapsed from the moment at which the change in the state of allocation. If the time "t" has not yet elapsed, the states of allocation of resource in both sessions after the change remain as they are. However, when it has been determined in Step S13 that the predetermined time "t" has elapsed after the moment of change in the states of resource allocation, the process proceeds to Step S14 in which the original states of resource allocation, i.e., the states before the change, are recovered in both communication sessions.

In the described embodiment, the recovery of the original states of resource allocation is conducted based on the present states of resources in the communication sessions stored in Step S11. This, however, is only illustrative and the process may be such that Step S11 stores the amount of change in the resource amount, i.e., the amount of preemption of the resource, so that the recovery to original states of resource allocation is conducted based on the amount of preemption stored in Step S11.

As described before in connection with FIG. 1, conventional dynamic QoS control is in most cases such that the control is explicitly performed by the entity (host computer or node) which is on the communication end point. In such cases, it is common that the control is conducted by the entity from which the demand for generating communication session has been issued.

The automatic QoS control as proposed by the present invention, however, enables an entity other than the end entity to issue a QoS control message.

Figure 5:
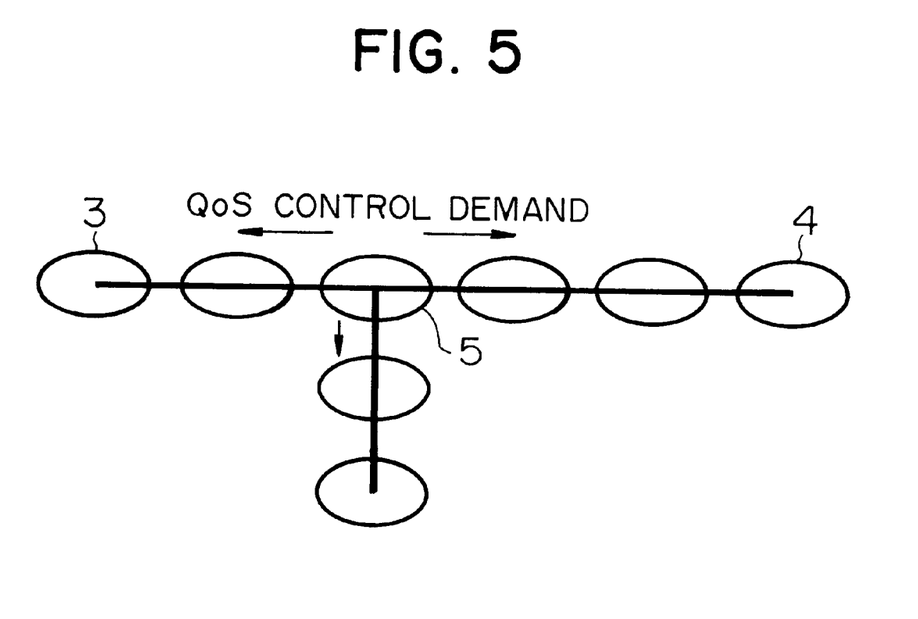
FIG. 5 is a state of operation in which a QoS control demand has been issued from a gateway node.

FIG. 5 illustrates a network in which an automatic QoS control demand is issued from an intermediate gateway. Considering the background or environment in which the internet is used, the frequent use of resources most probably concentrates to a gateway by way of which a plurality of communication sessions take place. It is therefore desirable that the automatic QoS control is initiated at the intermediate gateway rather than at one of the end entities (Source 3 and Destination 4).

The automatic QoS control method described above enables the intermediate gateway 5 to issue the automatic control demand.

A description will now be given of implementation of the above-described automatic QoS control method. It is possible to use, as the base system, a distributed-object-oriented operating system available as "Aperios" (registered trademark). It is necessary that a time limit is posed also on the exchange of the above-described control messages (protocol control messages), for otherwise effective transfer of time data will fail. According to the invention, therefore, an automatic QoS control mechanism, which performs data transfer processing and processing for receiving demand from application, is implemented in the meta-space of Aperios, so as to incorporate the exchange of protocol messages in the network architecture which is based on a VSL(Virtually Separated Link) model.

Figure 6:
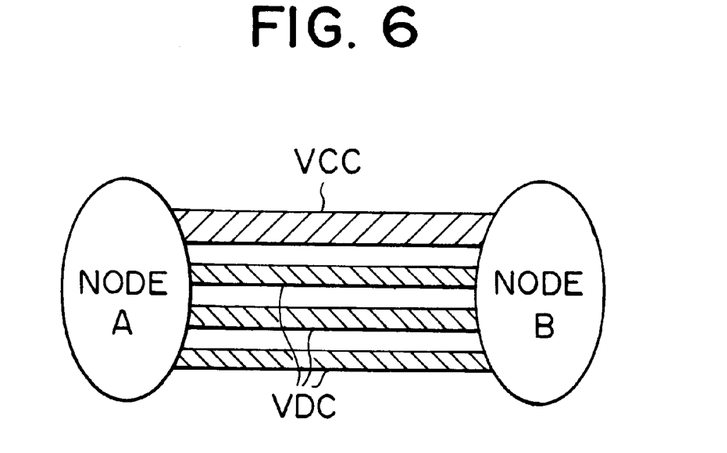
FIG. 6 is an illustration of a VSL model.

As will be seen from FIG. 6, the VSL model is a model in which available communication media of lower hierarchy are abstracted in the form of a pair of virtual circuits, in order to ensure the real-time nature of the control messages which are exchanged by the protocol for the purpose of generation, updating and deletion of status information held in the respective nodes (nodes A and B in the illustrated case). More specifically, the communication media can be used for establishing two types of channel: namely, a Virtual Control Channel (VCC) and a Virtual Data Channel (VDC). In general, a band for VCC and a band for VDC are set and VCC is established between nodes so as to be used constantly, whereas VDC is established by the application as necessary and is cut as it becomes unnecessary.

In such an implementation, it is possible to use an RtP (Real-time Communication Protocol) in order to enable minute control of time restriction in response to the protocol control message. The RtP is a connection-oriented protocol developed for use in the network layer of a 7-layered model. The introduction of the aforementioned VSL model permits the real-time nature to be maintained also in the exchange of messages of the protocol itself.

Two types of reservation procedures, one for the Virtual Control Channel (VCC) and the other for Virtual Data Channel (VDC) of the VSL model, are defined in the RtP.

The RtP communication can be sorted into the following three classes:

(1) ordinary datagram communication;
(2) communication through VCC; and
(3) communication through VDC.

The ordinary datagram communication is a conventional communication which has no dependency on time, i.e., a communication implemented by a protocol such as IP (Internet Protocol). Communication method also is available using channels which have already been established. The communication through VDC transfers ordinary data, while communication through VCC transfers control data.

The described technique makes it possible to impose a time restriction on the exchange of the control messages described before, thus enabling efficient transfer of time data.

Although in the described embodiment the automatic QoS control mechanism is implemented on the distributed-object-oriented operating system "Aperios", this is only illustrative and the automatic QoS control mechanism may be implemented in other ways.

As will be understood from the foregoing description, according to the communication control method and apparatus of the present invention, the states of use of resource allocated to communication sessions are monitored and, when a predetermined message demanding a change in the amounts of resource allocated to the sessions is received, a re-allocation is executed so as to allocate part or whole of resource which has been allocated to a preselected session to another session of communication, based on the states of use of the resources allocated to the respective communication sessions. Thus, when the predetermined message is received, a resource which has been allocated to predetermined session can be preempted from this session and allocated to another communication session. Therefore, when for example a certain communication session is temporarily required to transfer of a large quantity of data, a large amount of resource is temporarily re-allocated to such a communication session to enable it to meet the requirement, thus achieving effective use of the resource.

What is claimed is:

1. A communication controlling method for controlling, in executing inter-node data transfers between nodes on a network, amounts of a resource allocated to a plurality of communication sessions which are present in said nodes, said method comprising:

a monitoring step in which each of the nodes monitors a state of use of the resource by each communication session present in said each of the nodes to which said resource has been allocated; and a resource re-allocating step in which, when a message demanding a change in the amount of resource allocated to a predetermined communication session is received at a first one of the nodes, the first one of the nodes reallocates all or part of the resource which has been allocated to another communication session is reallocated to said predetermined communication session, based on the states of use of the resource in the respective communication sessions which are present in said first one of the nodes and to which said resource has been allocated.

2. A communication controlling method according to claim 1, wherein said resource re-allocating step re-allocates all or part of the resource which has been allocated to another communication session to said predetermined communication session, in accordance with an order of priority given to said communication sessions.

3. A communication controlling method according to claim 1, wherein said resource re-allocating step includes:

a determining step for determining, based on an allowable range of resource amount set on each said communication session, whether or not the resource amount left in said another communication session after a preemption of all or part of the resource therefrom remains within the allowable range set on said another communication session; and a deciding step for deciding, based on the result of the determination made in said determining step, whether or not the resource which has been allocated to said another communication session is to be preempted and re-allocated to said predetermined communication.

4. A communication controlling method according to claim 1, wherein said message demanding a change in the amount of resource allocated to a predetermined communication session is to request a temporary change in the amount of resource allocated to said predetermined communication session, and wherein the re-allocation of the resource as a result of the change is dismissed after lapse of a predetermined time from the change, whereby the original allocation of said resource to said communication sessions is recovered.

5. A communication controlling method according to claim 1, wherein said message demanding a change in the amount of resource allocated to a predetermined communication session is controlled such that said message is transferred between said nodes within a predetermined time.

6. A communication controlling apparatus for controlling, in executing inter-node data transfers between nodes on a network, amounts of a resource allocated to a plurality of communication sessions which are present in said nodes, said apparatus comprising:

monitoring means at each of the nodes, each said monitoring means configured to monitor a state of use of the resource by each communication session present in said each of the nodes to which said resource has been allocated; and resource re-allocating means at said each of the nodes, each said monitoring means configured to re-allocate all or part of a resource which has been allocated to another communication session to a predetermined communication session in response to a message demanding a change in the amount of the resource allocated to the predetermined communication session, based on the states of use of the resource in the respective communication sessions which are present in said each of the nodes and to which said resource has been allocated.

7. A communication controlling apparatus according to claim 6, wherein said resource re-allocating means re-allocates all or part of the resource which has been allocated to said another communication session to said predetermined communication session in accordance with the order of priority given to said communication sessions.

8. A communication controlling apparatus according to claim 6, wherein said resource re-allocating means includes:

a determining means for determining, based on an allowable range of resource amount set on each said communication session, whether or not the resource amount left in said another communication session after a preemption of all or part of the resource therefrom remains within the allowable range set on said another communication session; and deciding means for deciding, based on the result of the determination made in said determining means, whether or not the resource which has been allocated to said another communication session is to be preempted and re-allocated to said predetermined communication session.

9. A communication controlling apparatus according to claim 6, wherein said message demanding a change in the amount of resource allocated to a predetermined communication session is to request a temporary change in the amount of resource allocated to said predetermined communication session, and wherein the re-allocation of the resource as a result of the change is dismissed after lapse of a predetermined time from the change, whereby the original allocation of said resource to said communication sessions is recovered.

10. A communication controlling apparatus according to claim 1, wherein said message demanding a change in the amount of resource allocated to a predetermined communication session is controlled such that said message is transferred between said nodes within a predetermined time.

* * * * *